(12) United States Patent
Ogale et al.

(10) Patent No.: US 9,892,327 B2
(45) Date of Patent: Feb. 13, 2018

(54) VISION-BASED INDICATOR SIGNAL DETECTION USING SPATIOTEMPORAL FILTERING

(71) Applicant: Waymo LLC, Mountain View, CA (US)

(72) Inventors: Abhijit Ogale, Mountain View, CA (US); Dave Ferguson, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/331,079

(22) Filed: Oct. 21, 2016

(65) Prior Publication Data

US 2017/0039435 A1 Feb. 9, 2017

Related U.S. Application Data

(63) Continuation of application No. 15/056,780, filed on Feb. 29, 2016, now Pat. No. 9,507,347, which is a continuation of application No. 13/927,248, filed on Jun. 26, 2013, now Pat. No. 9,305,223.

(51) Int. Cl.

| | |
|---|---|
| *G06K 9/00* | (2006.01) |
| *B60R 1/00* | (2006.01) |
| *G05D 1/00* | (2006.01) |
| *G05D 1/02* | (2006.01) |
| *G06K 9/46* | (2006.01) |
| *H04N 5/235* | (2006.01) |

(52) U.S. Cl.
CPC ............ *G06K 9/00791* (2013.01); *B60R 1/00* (2013.01); *G05D 1/0088* (2013.01); *G05D 1/0246* (2013.01); *G06K 9/00825* (2013.01); *G06K 9/4604* (2013.01); *G06K 9/4652* (2013.01); *G06K 9/4661* (2013.01); *H04N 5/2353* (2013.01); *B60R 2300/80* (2013.01)

(58) Field of Classification Search
CPC ...................................................... G06K 9/825
USPC ...................................................... 348/149
See application file for complete search history.

(56) References Cited

U.S. PATENT DOCUMENTS

| | | | | |
|---|---|---|---|---|
| 2012/0262600 | A1* | 10/2012 | Velarde | ................ H04N 5/2355 348/223.1 |
| 2012/0294481 | A1* | 11/2012 | Kasaoki | ............. G06K 9/00805 382/103 |
| 2014/0125813 | A1* | 5/2014 | Holz | .................. G06K 9/00375 348/169 |

* cited by examiner

*Primary Examiner* — Yulin Sun
(74) *Attorney, Agent, or Firm* — McDonnell Boehnen Hulbert & Berghoff LLP

(57) ABSTRACT

An autonomous vehicle is configured to detect an active turn signal indicator on another vehicle. An image-capture device of the autonomous vehicle captures an image of a field of view of the autonomous vehicle. The autonomous vehicle captures the image with a short exposure to emphasize objects having brightness above a threshold. Additionally, a bounding area for a second vehicle located within the image is determined. The autonomous vehicle identifies a group of pixels within the bounding area based on a first color of the group of pixels. The autonomous vehicle also calculates an oscillation of an intensity of the group of pixels. Based on the oscillation of the intensity, the autonomous vehicle determines a likelihood that the second vehicle has a first active turn signal. Additionally, the autonomous vehicle is controlled based at least on the likelihood that the second vehicle has a first active turn signal.

20 Claims, 8 Drawing Sheets

VISION-BASED INDICATOR SIGNAL DETECTION USING SPATIOTEMPORAL FILTERING

BACKGROUND

The present application claims priority to both U.S. patent application Ser. No. 15/056,780, filed on Feb. 29, 2016 and U.S. patent application Ser. No. 13/927,248, filed on Jun. 26, 2013, the entire contents of each is herein incorporated by reference.

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

The present application discloses embodiments that relate to detection of turn signal indicators in the field of view of an automobile. In one aspect, the present application describes a method. The method includes receiving, from an image-capture device, coupled to a first vehicle, an image of a field of view of the first vehicle. The image-capture device is configured to capture an image with a short exposure to emphasize objects having brightness above a threshold. Additionally, the method includes determining a bounding area for a second vehicle located within the image. The method also includes identifying a group of pixels in the image based on a first color of the group of pixels, where the group of pixels is located within a region of the bounding area. The method also includes calculating an oscillation of an intensity of the group of pixels. Based on the oscillation of the intensity, the method determines a likelihood that the second vehicle has an active indicator signal. Additionally, the method includes providing instructions to control, using a computing device, the vehicle based at least on the likelihood that the second vehicle has an active indicator signal.

In some examples of the method, the bounding area may be determined based on data stored in a memory. And in additional examples, the oscillation of the group of pixels may be between about 0.75 and about 2.5 Hertz. Further, in various examples, the method may include determining a likelihood that the second vehicle has another active indicator signal, based on a second oscillation of a second group of pixels. Additionally, the method may also include determining, based on both the likelihood that the second vehicle has an active indictor signal and the likelihood that the second vehicle has a second active turn signal, a likelihood that the second vehicle has active emergency lights. In some embodiments, the bounding area defines a region of the image in which the second vehicle is located.

In some examples, the method may also identify a group of pixels in the image based on a second color of the group of pixels and determine a correlation between the intensity of the first color of the group of pixels and an intensity of the second color of the group of pixels. And based on the correlation, the method may determine a likelihood that the second vehicle has the active indicator signal. The method may also identify a sun glare based on the correlation.

In another aspect, the present application describes a control system. The control system includes at least one processor and a memory. The memory has stored thereon instructions that, upon execution by the at least one processor, cause the control system to perform functions. The functions include receiving, from an image-capture device coupled to a first vehicle, an image of a field of view of the first vehicle. The image-capture device is configured to capture an image with a short exposure to emphasize objects having brightness above a threshold. Additionally, the functions include determining a bounding area for a second vehicle located within the image. The functions also include identifying a group of pixels in the image based on a first color of the group of pixels, where the group of pixels is located within a region of the bounding area. The functions also include calculating an oscillation of an intensity of the group of pixels. Based on the oscillation of the intensity, a function determines a likelihood that the second vehicle has an active indicator signal. Additionally, functions include providing instructions to control, using a computing device, the vehicle based at least on the likelihood that the second vehicle has an active indicator signal.

In some additional examples, the control system may include functions where bounding area is determined based on data stored in a memory. In further examples, the control system functions may determine the oscillation is between about 0.75 and about 2.5 Hertz. Additionally, the functions may also include determining, based on both the likelihood that the second vehicle has an active indicator signal and the likelihood that the second vehicle has another active indicator signal, a likelihood that the second vehicle has active emergency hazard lights. In some embodiments, the bounding area defines a region of the image in which the second vehicle is located.

In some examples, the functions may also identify a group of pixels in the image based on a second color of the group of pixels and determine a correlation between the intensity of the first color of the group of pixels and an intensity of the second color of the group of pixels. And based on the correlation, the functions may determine a likelihood that the second vehicle has the active indicator signal.

In yet another aspect, the present application describes a non-transitory computer readable medium having stored thereon instructions, that when executed by a computing device, cause the computing device to perform functions. The functions include receiving, from an image-capture device coupled to a first vehicle, an image of a field of view of the first vehicle. The image-capture device is configured to capture an image with a short exposure to emphasize objects having brightness above a threshold. Additionally, the functions include determining a bounding area for a second vehicle located within the image. The functions also include identifying a group of pixels in the image based on a first color of the group of pixels, where the group of pixels is located within a region of the bounding area. The functions also include calculating an oscillation of an intensity of the group of pixels. Based on the oscillation of the intensity, a function determines a likelihood that the second vehicle has an active indicator signal. Additionally, functions include providing instructions to control, using a computing device, the vehicle based at least on the likelihood that the second vehicle has an active indicator signal.

In some additional examples, the control system may include functions where bounding area is determined based on data stored in a memory. In further examples, the control system functions may determine the oscillation is between about 0.75 and about 2.5 Hertz. Additionally, the functions may also include determining, based on both the likelihood that the second vehicle has an active indicator signal and the likelihood that the second vehicle has another active indicator signal, a likelihood that the second vehicle has active emergency lights. In some embodiments, the bounding area defines a region of the image in which the second vehicle is located.

In some examples, the functions may also identify a group of pixels in the image based on a second color of the group of pixels and determine a correlation between the intensity of the first color of the group of pixels and an intensity of the second color of the group of pixels. And based on the correlation, the functions may determine a likelihood that the second vehicle has the active indicator signal.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
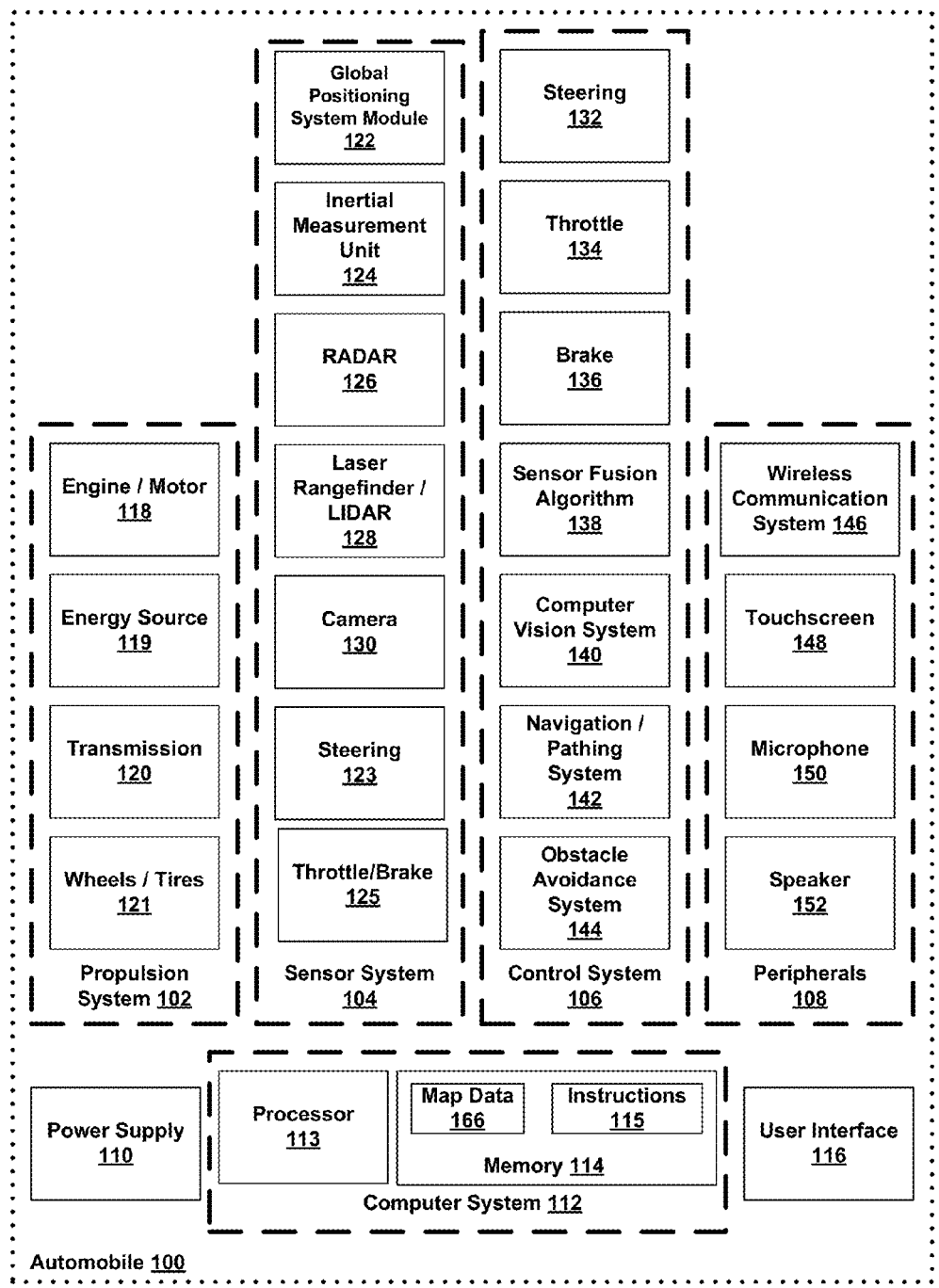
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

An example embodiment involves an autonomous vehicle configured with an imaging system. The imaging system may include a camera configured to capture images, video, or both images and video. The captured images and video are stored in a memory for processing. Some or all of the captured images may be forward-facing images of a field of view of the vehicle. For example, some of the images captured by the imaging system may resemble the view a driver of the vehicle may see as the driver operates the vehicle. Additional images may capture side and rear views from the vehicle as well.

A processing system in the vehicle is configured to detect turn signal indicators or other signal indicators associated with cars in the captured images and video. The processing system detects turn signal indicators by first receiving an indication of a vehicle located in a captured image. The indication of a vehicle can be included in a bounding area of an image. The bounding area defines a region within the captured image where a vehicle is located. In some examples, a vehicle detection system may first locate vehicles within at least one captured image and responsively define a respective bounding area for each of the said vehicles.

Additionally, the camera in the vehicle may capture an image with a short exposure time. The short exposure images may be captured in addition to normal exposure images. For example, the camera may capture short exposure images and normal exposure images in an alternating manner. The short exposure time causes the image to generally be dark with the brightest portions of the field of view of the vehicle to be present in the image as a group of pixels. When the bounding areas for vehicles are overlaid on the short exposure image, the group of pixels of the image may be compared to the bounding area to determine if they correspond to turn signal indicators. Further, a plurality of short exposure time images may be captured. A variation in the intensity of the group of pixels may be calculated. If the group of pixels corresponded to an active turn signal indicator, the intensity of the group of pixels may have an oscillation between about 0.75 and about 2.5 Hz.

A control system of the vehicle may responsively adjust the vehicle control when vehicles are detected in the captured image. For example, the control system may alter a course of the vehicle or alter a speed of the vehicle. Additionally, the control system may record the position of the vehicle detected in the image. The control system may calculate vehicle control signals based on vehicles detected within the field of view.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to capture an image with a camera in vehicle 100, analyze the image for the presence of a turn signal indicator, and responsively control vehicle 100 based on the presence of the turn signal indicator. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway map data 166, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data 166 stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

The computer system 112 could carry out several determinations based on the indications received from the input- and output-indication sensors. For example, the computer system 112 could calculate the direction (i.e. angle) and distance (i.e. range) to one or more objects that are reflecting radar signals back to the radar unit 126. Additionally, the computer system 112 could calculate a range of interest. The range of interest could, for example, correspond to a region where the computer system 112 has identified one or more targets of interest. Additionally or additionally, the computer system 112 may identify one or more undesirable targets. Thus, a range of interest may be calculated so as not to include undesirable targets.

In some embodiments, the computer system 112 may make a determination about various objects based on data that is provided by systems other than the radar system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
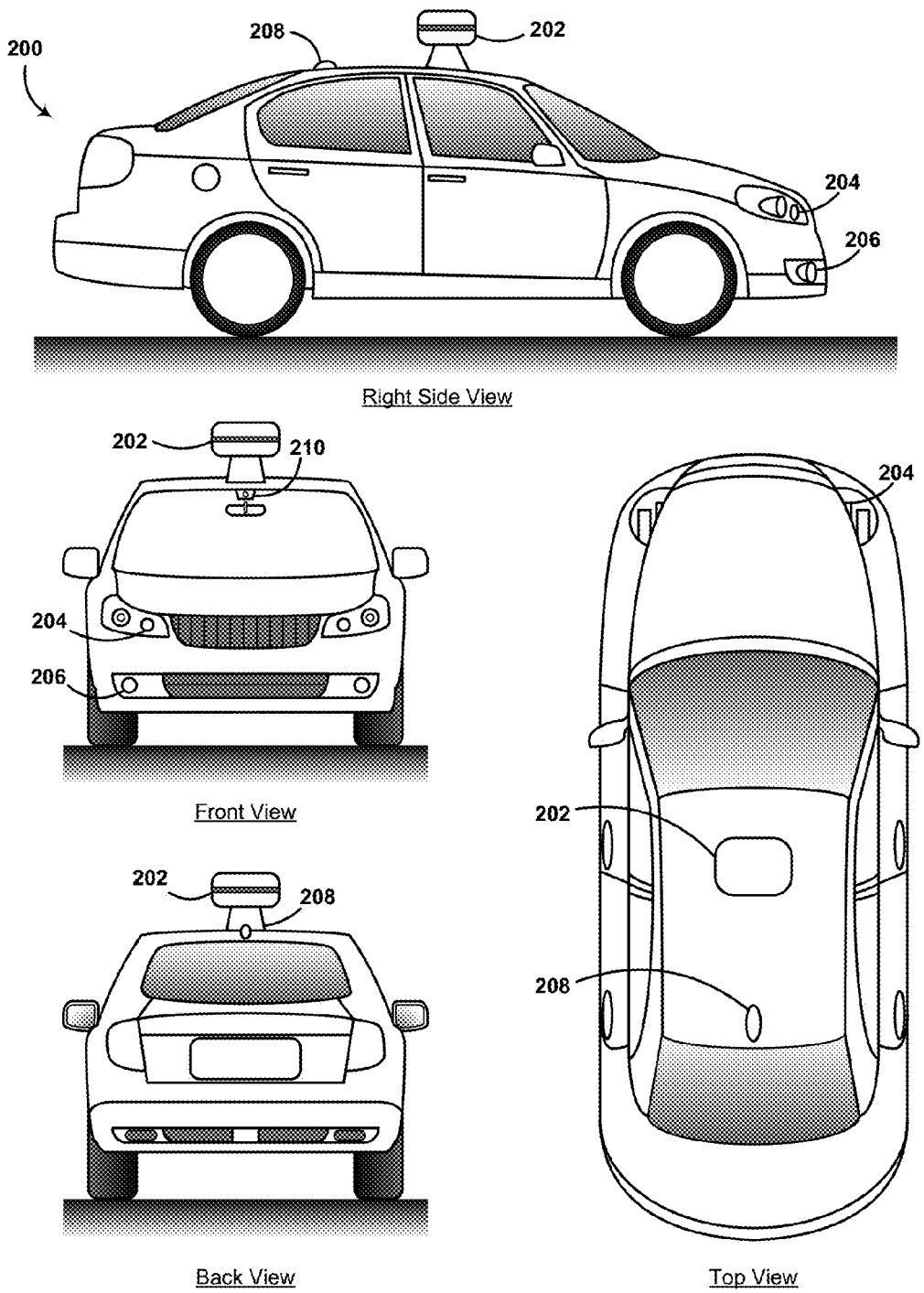
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 208, a radar 206, a laser rangefinder 204, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 204.

The wireless communication system 208 could be located as depicted in FIG. 2. Alternatively, the wireless communication system 208 could be located, fully or in part, elsewhere. The wireless communication system 208 may include wireless transmitters and receivers that could be configured to communicate with devices external or internal to the vehicle 200. Specifically, the wireless communication system 208 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
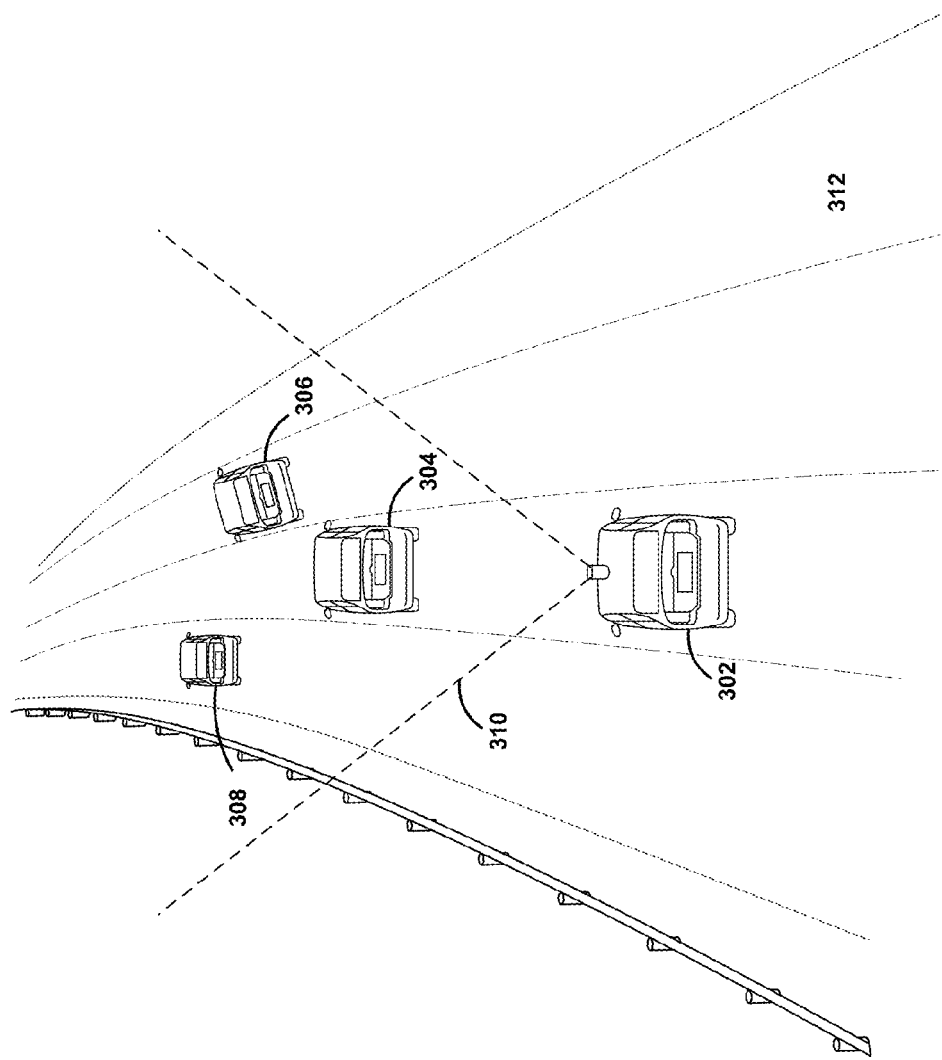
FIG. 3A illustrates an example field of view of a vehicle.

FIG. 3A illustrates an example field of view 310 of a vehicle 302. The vehicle 302 includes an imaging device, such as camera 134 as described with respect to FIG. 1. The camera on the vehicle 302 has an associated field of view 310. The field of view 310 depends on the specific camera that is used. The field of view 310 may be adjusted by changing the zoom level, focal length, or lens of the camera on the vehicle. For example, in some embodiments, the vehicle may include a camera with a telephoto lens. The telephoto lens enables the camera to zoom; however, the zoom reduces the field of view 310 of the camera.

As the vehicle 302 travels down a roadway 312, the field of view 310 of the camera may point in the direction of travel of the vehicle 302. Within the field of view 301, there may be a plurality of vehicles. As shown in FIG. 1, vehicles 304, 306, and 308 are all within the field of view 310 of vehicle 302. The vehicles 304, 306, and 308 are all shown traveling in the same direction as vehicle 302; however, vehicles within the field of view 310 may be traveling in directions other than in the same direction as vehicle 302. For example, some of the vehicles within the field of view may be traveling towards vehicle 302 or perpendicular to vehicle 302. Additionally, vehicles 304 and 308 may be completely visible within the field of view 310 of vehicle 302. Conversely, within the field of view 301, vehicle 306 may be partially obstructed by the vehicle 304.

The camera of vehicle 302 is configured to either capture video or sill frames of the field of view 310. The captured images or video will later be processed to identify whether or not vehicles, such as vehicles 304, 306, and 308, are within the field of view 310 of vehicle 302.

Figure 3B:
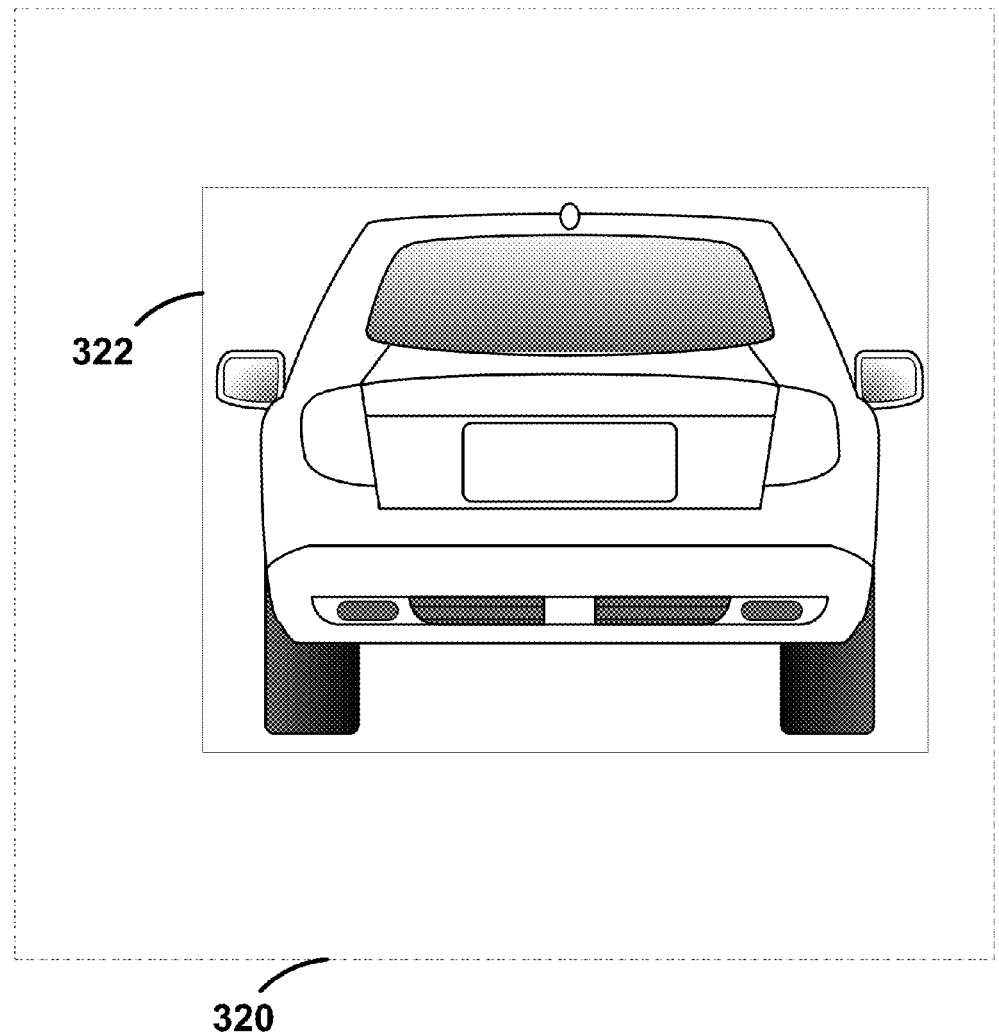
FIG. 3B illustrates an example bounding area within an image.

FIG. 3B illustrates a bounding area 322 within an image 320. The image 320 corresponds to an image captured of the field of view 310 of FIG. 3A. In one embodiment, a processing system in the vehicle will analyze image 320 to determine if image 320 contains a depiction of a vehicle. However, in other embodiments, the processing system in the vehicle may already know the location of vehicles within an image based on data from other sensors. The processing system may already know about the location of other vehicles based on data stored in the memory of the vehicle. The data in the memory may have been stored by a vehicle detection system. In each embodiment, the bounding area 322 corresponds to the location of at least one vehicle in the captured image.

Each vehicle in the captured image may have its own respective bounding area. In some situations, the bounding area corresponding to one vehicle may overlap the bounding area corresponding to another vehicle. In these situations, the processing system will determine which vehicle is in the foreground and which vehicle in the background. Because the vehicle in the foreground is fully within view, it will be completely contained within a bounding area. The vehicle in the background will be partially obscured by the foreground vehicle, thus its respective bounding area may be clipped or adjusted so only the respective vehicle is contained within the bounding area.

Figure 3C:
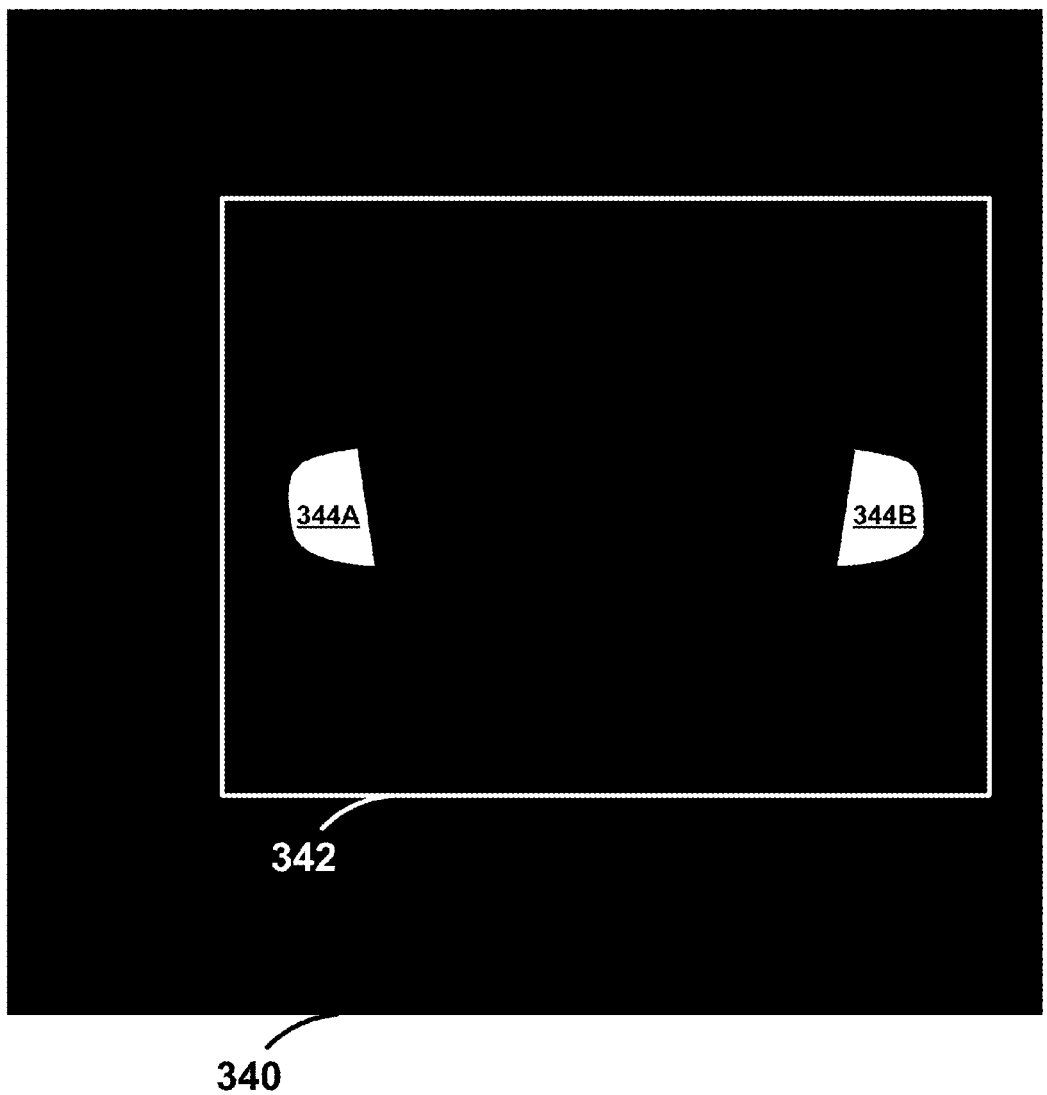
FIG. 3C illustrates an example image with a short exposure.

FIG. 3C illustrates an image 340 with a short exposure time. When an image is captured with a short exposure time, the image appears quite dark. Only the brightest spots within the field of view of the camera will show up in the image 340. Further, an exposure time and shutter speed of the camera may be selected based on the desired image characteristics. In some embodiments, image 320 of FIG. 3B and image 340 may be captured sequentially. Image 320 may be used by the vehicle detection system to determine a bounding area for a vehicle in the image 320. Because image 340 may have been captured right after image 320 was captured, the bounding area for the vehicle in image 320 will be the same (or substantially similar) as a bounding area 342 for the vehicle in image 340. Further, image 340 may be too dark for the vehicle detection system to determine a vehicle based just on image 340 itself. Additionally, in some other embodiments the bounding area 342 for image 340 may be calculated based on data stored in a memory of the vehicle.

The turn signal detection system may search the bounding area 342 of the short exposure time image 340 to determine if turn signal indicators are present within the bounding area 342. Because the bounding area 342 corresponds to the maximum extent of the vehicle in the image, any turn signal indicators corresponding to the vehicle will be located within the bounding area 342. Additionally, because image 340 has a short exposure time, any object in the image that are bright show up in image 340. The turn signals (344A and 344B) of the vehicle in image 340 are shown by left turn signal 344A and right turn signal 344B each appear as a group of pixels in image 340. Both the left turn signal 344A and the right turn signal 344B are located within the bounding area 342. In some instances, bounding area 342 may contain more objects other than left turn signal 344A and right turn signal 344B. Each object may appear as a lighter group of pixels within the bounding area 342. The turn signal detection system will analyze each group of pixels to determine if it is an active turn signal indicator.

In one embodiment, the turn signal detection system detects a possible turn signal by filtering inside each car bounding box of the the dark image with a weighted template. The weighted template may be a rectangle (or other shape) with weights −1, 0, and +1. Different weighting values may be used depending on the embodiment. The filter may iteratively analyze each portion of the bounding box to determine a score for each position of the template. Bright pixels inside the template are weighted as +1, those in the border region of the template are weighted as 0, and those outside the template are weighted as −1. When the brightest region is within the template, the template has the highest score. This template allows the identification of the brightest amber-colored (or red-colored) rectangular group of pixels within the bounding box. In some embodiments, the bounding box is divided into a left and right half for each car within the image. The value of the brightness of these left and right groups of pixels may be monitored over time to detect oscillations of the desired frequency in each half of the car.

Figure 3D:
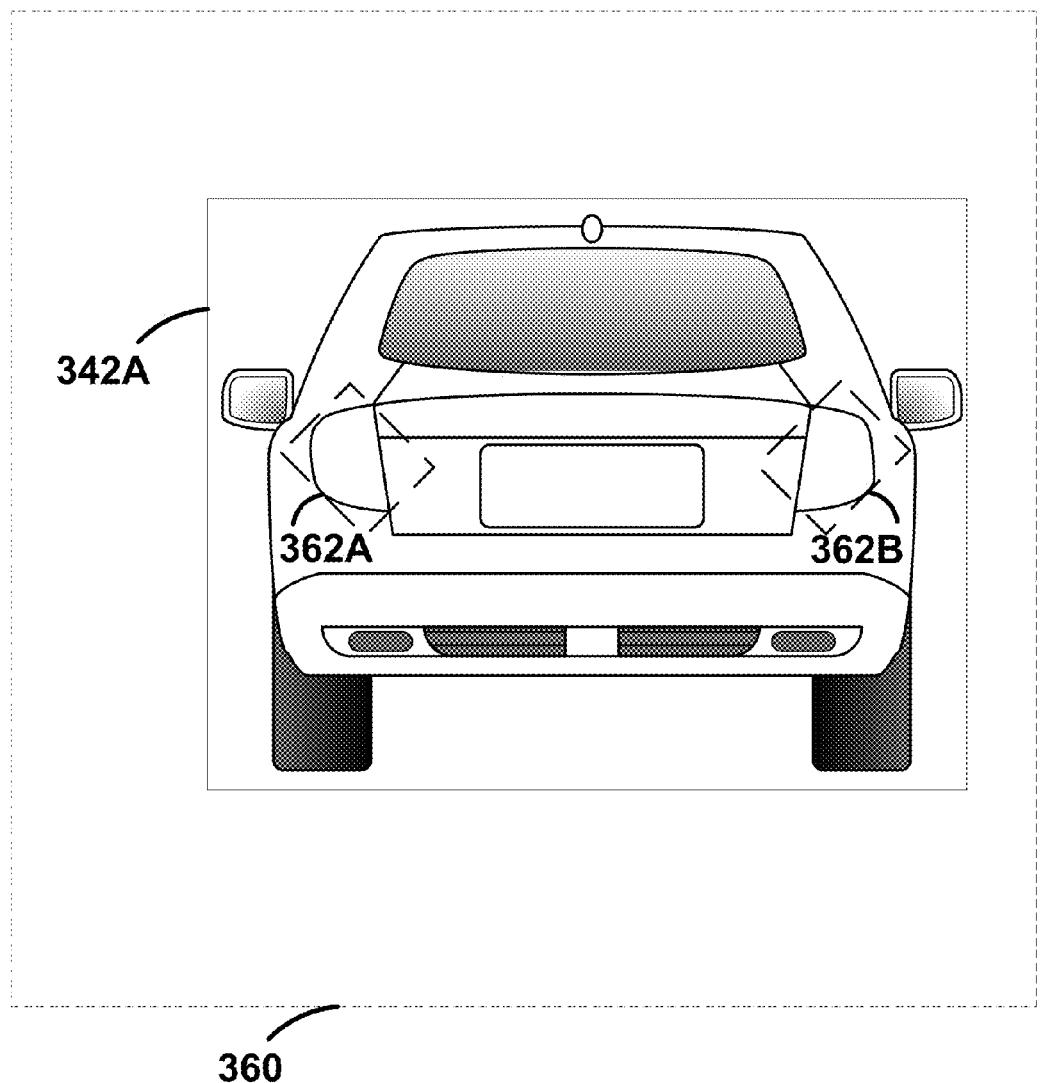
FIG. 3D illustrates two example groups of pixels within an image.

FIG. 3D illustrates two groups of pixels 362A and 362B within an image 360 as identified via the short exposure time image 340 of FIG. 3C. The first group of pixels 362A corresponds to the left turn signal 344A and the second group of pixels 362B corresponds to the right turn signal 344B. As shown, FIG. 3D contains image 360 (similar to image 320 shown in FIG. 3B); however, an image similar to image 340 (of FIG. 3C) may also be used to identify the group of pixels. FIG. 3D contains an image similar to image 320 for the sake of explanation as image 340 is too dark to show the actual vehicle. However, the explanation presented here is applicable to either an image similar to image 320 or an image similar to image 340.

To determine if each group of pixels corresponds to an active turn signal indicator, two different determinations may be used. One determination makes an analysis of the color of both the turn left turn signal 344A and the right turn signal 344B. The other determination analyzes the variation in intensity of the group of pixels.

Because turn signals are typically either red or amber (yellow) in color, the image 360 may be analyzed based on each individual color component of the image. For example, image 360 may be divided into separate images for each color channel. In order to determine whether the group of pixels indicate a turn signal or whether the group of pixels indicate sun glare, a target color channel may be compared to an undesirable color channel. For example, when one (or both) of the two groups of pixels 362A and 362B indicate a presence of either red or amber, the group of pixels may be a turn signal indicator. However, if the one (or both) of the two groups of pixels 362A and 362B indicate the presence of an undesired color as well (such as blue), then the group of pixels likely does not indicate a turn signal. The presence of both the desired color (red or amber) and the undesired color indicate the group of pixels is caused by a light source with a fuller color spectrum than that of a turn signal, often this fuller color spectrum light source is glare from the sun or other light source.

Additionally, the intensity level of the two groups of pixels 362A and 362B is analyzed. A turn signal indicator has three different modes of signaling. In the first mode the turn signal indicator has a steady low intensity. This steady low intensity indicates a vehicle is in a normal operating state. Additionally, this steady low intensity may also indicate that the vehicle has its headlights on. In the second mode of operation, the turn signal indicator has a steady high intensity. This steady high intensity typically indicates a vehicle is braking. Thus, both turn signal indicators would have a steady high intensity at the same time. The third signaling mode is an oscillation from high intensity to low intensity. When the oscillation from high intensity to low intensity is on one of the two groups of pixels 362A and 362B, it indicates an active turn signal. However, when the oscillation from high intensity to low intensity is on both of the two groups of pixels 362A and 362B, it indicates either emergency flashers or a tapping the brakes. Thus, to detect turn signals, the processing system determines if one of the two groups of pixels 362A and 362B has an oscillating intensity while the opposing group of pixels does not. Typically, a turn signal will have an oscillation between about 0.75 and about 2.5 Hertz.

Figure 4:
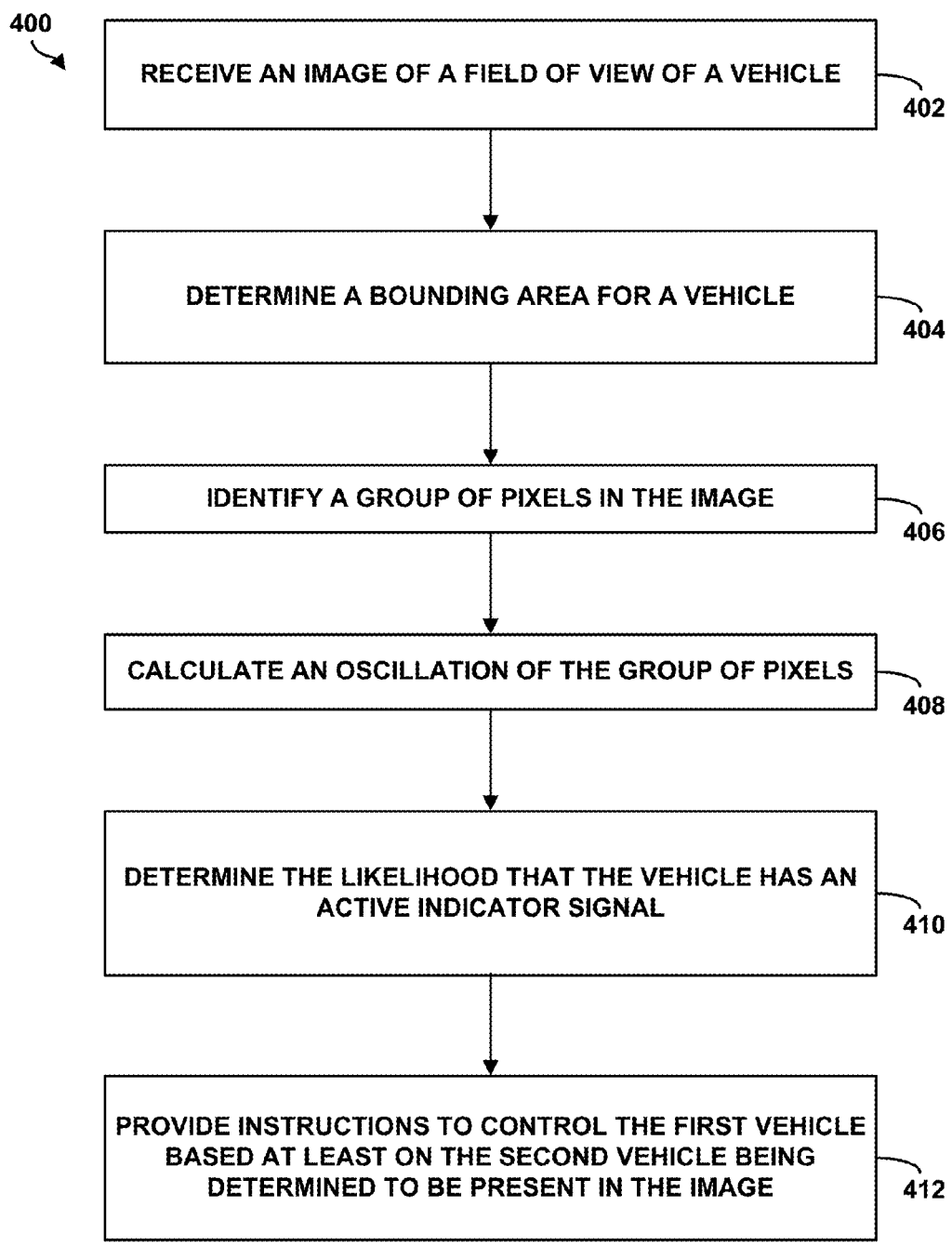
FIG. 4 illustrates an example method for real-time image-based turn signal detection.

FIG. 4 illustrates an example method 400 for real-time image-based turn signal detection. A method 400 is provided for real-time image-based turn signal detection for the self-driving car. The method could be performed to detect turn signals associated with vehicles in images, similar to what was described with respect to FIGS. 3A-3D; however, the method 400 is not limited to the scenarios shown in FIGS. 3A-3D. FIG. 4 illustrates the blocks in an example method for real-time image-based turn signal detection for the self-driving car. However, it is understood that in other embodiments, the blocks may appear in different order and blocks could be added, subtracted, or modified. Additionally, the blocks may be performed in a linear manner (as shown) or may be performed in a parallel manner (not shown).

Block 402 includes receiving an image of a field of view of a vehicle. As previously discussed, the autonomous vehicle includes an imaging system. The imaging system is configured to capture either (i) still images or (ii) video of a field of view in front of the vehicle. The imaging system stores the captured image or data as data in a memory. At block 402, the images may be received from the memory for processing. In additional embodiments, at block 402, images may be received directly from the imaging system. However, in both embodiments, data representative of an image (or a video) is received for processing. If the data corresponds to a video, a single frame may be extracted from the video for analysis. Additionally, multiple frames of video may be analyzed either sequentially or in parallel.

The image received at block 402 may be similar to image 340 of FIG. 3C, an image that was captured with a short exposure time and a relatively fast shutter. When an image is captured with a short exposure time and a relatively fast shutter, the image appears quite dark. Only the brightest spots within the field of view of the camera will show up an image captured in this way. For example, when a camera captures an image of the field of view of the vehicle using a short exposure time and a relatively fast shutter, the image will generally appear almost completely black with only illuminated objects showing up in the image. Thus, the image may only include illuminated tail lights, turn signal indicators, traffic signals, and other objects.

Block 404 includes determining a bounding area for a vehicle of the image. A bounding area defines a region within an image where a vehicle is located. For example, when an image is captured by a still or video camera, the image may contain a vehicle that was within the field of view of the autonomous vehicle. A bounding area defines the region of the image in which that vehicle is located. Thus, the vehicle in the captured image fits within the bounding area. Each vehicle in the captured image may have its own respective bounding area.

In some situations, the bounding area corresponding to one vehicle may overlap the bounding area corresponding to another vehicle. In these situations, the processing system will determine which vehicle is in the foreground and which vehicle in the background. Because the vehicle in the foreground is fully within view, it will be completely contained within a bounding area. The vehicle in the background will be partially obscured by the foreground vehicle, thus its respective bounding area may be clipped so only the respective vehicle is contained within the bounding area. In one example, a car with an active turn signal on may pass in front of another car. Due to the overlap in bounding boxes, the blinking lights of the car that is further away appear within the bounding box of the car nearer in the image. Therefore, the turn signal detection system will determine which car the blinking turn signal is associated with. Because the turn signal detection template looks for blinking groups of pixels of a certain size relative to each car, it will not associate the blink with the near car because the group of pixels has the wrong size for the near vehicle. The oscillating group of pixels is too small.

In one embodiment, a processing system in the vehicle will analyze a captured image to determine if the captured image contains a depiction of a vehicle. However, in other embodiments, the processing system in the vehicle may already know the location of vehicles within an image based on other sensors on the autonomous vehicle. The other sensors on the autonomous vehicle may record the location of vehicles located near the autonomous vehicle to a memory. For example, the combination of a laser system and a radar system may detect the locations of vehicles near the autonomous vehicle. These vehicle locations may be stored in a memory. The processing system may retrieve the data stored in the memory of the vehicle. Based on the stored data, the processing system may determine a bounding area for any respective vehicles located in the image.

Block 406 includes identifying a group of pixels in the image. The turn signal detection system may search the bounding area of the short exposure time image to determine at least one group of pixels in the image. Because the bounding area corresponds to the maximum extent of the vehicle in the image, any turn signal indicators corresponding to the vehicle will be located within the bounding area. In some embodiments, the left and right halves of the bounding area are analyzed independently. Analyzing the left and right halves of the bounding area independently may allow the turn signal detection system to more easily identify whether a turn signal is associated with the left or right side of a vehicle. Additionally, analyzing the left and right halves of the bounding independently may allow the turn signal detection system to identify a turn signal when a vehicle is partially obscured by another object, such as another vehicle. Additionally, because the image has a short exposure time and a fast shutter, objects in the field of view of the vehicle that are bright show up in image. The turn signals of a vehicle in image will show up as a group of pixels within the bounding area of the captured image. In some instances, the bounding area may contain groups of pixels corresponding to objects other than the turn signals. For example, the vehicle may reflect sunlight toward the camera or the vehicle may have a rear brake light. Each of these objects may also appear as a group of pixels within the bounding area. The turn signal detection system will analyze each group of pixels to determine if it is an active turn signal indicator.

To determine if each group of pixels corresponds to an active turn signal indicator, a determination of the color of the pixels in each group of pixels may be used. As previously discussed, because turn signals are typically either red or amber (yellow) in color, each group of pixels may be analyzed based on the individual color components of the group of pixels. For example, the captured image may be divided into separate images for each color channel. In order to determine whether the group of pixels indicates a turn signal or whether the group of pixels indicates a different light source, such as sun glare, a target color channel may be compared to an undesirable color channel.

In one example, if each group of pixels indicates a presence of either red or amber, the group of pixels may be a turn signal indicator. However, if the group of pixels indicates the presence of an undesired color as well (such as blue), then the group of pixels likely does not indicate a turn signal (as blue is not a color component of a turn signal). The presence of both the desired color (red or amber) and the undesired color indicate the group of pixels is caused by a light source with a fuller color spectrum than that of a turn signal, often this fuller color spectrum light source is glare from the sun or other light source. Thus, block 406 determines at least one group of pixels that may correspond to a turn signal.

At block 408, an oscillation of the group of pixels is calculated. As previously discussed, a turn signal indicator has three different modes of signaling. In the first two modes of operation the turn signal indicator has a steady intensity that is either high or low. However, having a relatively steading intensity indicates that the turn signal is not currently active because an active turn signal blinks. The third signaling mode is an oscillation from high intensity to low intensity. An oscillation from high intensity to low intensity indicates the vehicle within the bounding area may have an active turn signal. Typically, a turn signal will have an oscillation between about 0.75 and about 2.5 Hertz. Thus, at block 408 groups of pixels are considered to possibly be turn signal indicators if the group of pixels has an intensity with an oscillation between about 0.75 and about 2.5 Hertz.

At block 410, the likelihood that a vehicle has and active turn signal indicator is calculated. In order for a group of pixels to likely be a turn signal, a three-part test may be used. First, the pixels should have a color corresponding to the color of turn signal (as identified at block 406), the pixels should have an oscillation between about 0.75 and about 2.5 (as calculated at block 408), and the group of pixels should have a shape that fits within a template shape. An oscillation from high intensity to low intensity on a group of pixels indicates the possibility of an active turn signal; however, if a single bounding area has two (or more) groups of pixels that are the correct color and oscillating, the groups of pixels may indicate either emergency flashers on the vehicle or a tapping the brakes on the vehicle. Additionally, the template shape may be configured to detect groups of pixels that form a shape generally similar to a rectangle or circle, while possibly rejecting a group of pixels that form a thin line. Pixels that form a thin line are likely not a turn signal, but are indicative of a different light source, such as a glare. Another common occurrence besides sun glare is that cars passing under tree or bridge shadows appear to have their signals blink, but the combination of the above checks rejects such cases (as the oscillation my not have a strong enough variation in intensity, the oscillation may not have the correct frequency, etc).

Thus, to detect a likely turn signal indicator, the processing system determines if there is a group of pixels with a given bounding area that has both the correct color for the pixels and an oscillating intensity. In some embodiments, the processing system looks for the brightest group of pixels in each half of the bounding area. Further, the image may contain a second group of oscillating pixels that correspond to a different bounding area. If only the group on one side has an oscillation over time, it is deemed a turn signal. If both sides oscillate, it may be deemed to be an emergency flasher. Brake taps are detected because they do not oscillate with the right frequency, and they rarely oscillate more than once. The processing system increases its confidence in turn signal prediction as it observes multiple blinks. When second group of oscillating pixels that correspond to a different bounding area is detected, this may indicate there is a likelihood of a second vehicle having an active turn signal indicator as well. In response to determining that there is a likelihood that there is at least one vehicle with an active turn signal indicator, a control strategy of the autonomous vehicle may be modified.

At block 412, the method 400 includes controlling the first vehicle based on the modified control strategy. In an example, a computing device may be configured to control actuators of the first vehicle using an action set or rule set associated with the modified control strategy. For instance, the computing device may be configured to adjust translational velocity, or rotational velocity, or both, of the vehicle based on the modified driving behavior. In additional examples, the computing device may alter a course of the vehicle or alter a speed of the vehicle. Additionally, the computing device may record the detected turn signal of the vehicle in the image. The computing device may calculate vehicle control signals based turn signals on vehicles detected within the field of view.

Figure 5:
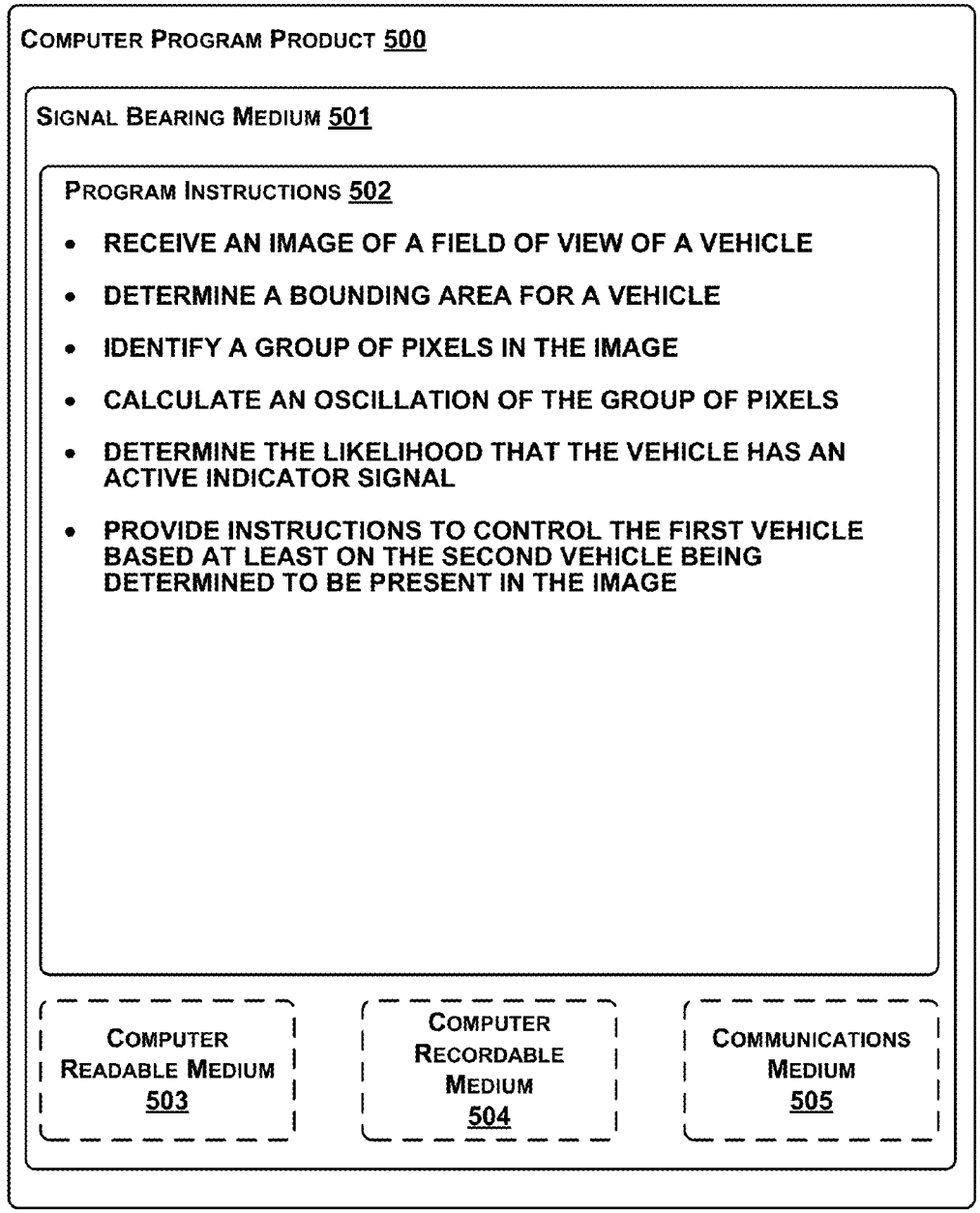
FIG. 5 illustrates an example computer readable medium configured for real-time image-based turn signal detection.

In some embodiments, the disclosed methods may be implemented as computer program instructions encoded on a computer-readable storage media in a machine-readable format, or on other non-transitory media or articles of manufacture. FIG. 5 illustrates an example computer readable medium in the form of a computer program product 500 that includes a computer program for executing a computer process on a computing device, arranged for real-time image-based car detection. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4. Thus, for example, referring to the embodiments shown in FIG. 4, one or more features of blocks 402-412 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   receiving, from an image-capture device coupled to a first vehicle, an image of a field of view of the first vehicle, wherein the image-capture device is configured to capture an image with a short exposure to emphasize objects having a brightness above a threshold;
   determining a first bounding area within the image including a depiction of a second vehicle;
   determining a second bounding area within the image including a depiction of a third vehicle, wherein at least a portion of the first bounding box overlaps the second bounding box;
   identifying a group of pixels in the image based on an intensity of the group of pixels, wherein the group of pixels is located within the overlapping portion of the bounding boxes;
   determining, based on an oscillation of the intensity of the group of pixels, a likelihood that the group of pixels is an active indicator signal;
   determining which of the second vehicle and the third vehicle the group of pixels is associated with based on the size of the group of pixels; and
   providing instructions to control, using a computing device, the first vehicle based at least on the likelihood that the determined vehicle has an active indicator signal.

2. The method of claim 1, wherein the bounding area is determined based on a previously stored image.

3. The method of claim 1, wherein the oscillation is between 0.75 and 2.5 Hertz.

4. The method of claim 1, further comprising:
   determining, based on a second oscillation of a second group of pixels, a likelihood that the determined vehicle has another active indicator signal; and
   determining, based on both the likelihood that the determined vehicle has an active indicator signal and the likelihood that the determined vehicle has another active indicator signal, a likelihood that the second vehicle has active emergency lights.

5. The method of claim 1, wherein the third vehicle obscures the view of at least a portion of the second vehicle.

6. The method of claim 1, further comprising:
   identifying a group of pixels in the image based on a second color of the group of pixels, wherein the group of pixels is located within a bounding area of the determined vehicle;
   determining a correlation between an intensity of a first color of the group of pixels and an intensity of the second color of the group of pixels; and
   determining, based on the correlation, a likelihood that the determined vehicle has the active indicator signal.

7. The method of claim 6, further comprising identifying a sun glare based on the correlation.

8. A control system comprising:
   at least one processor; and
   receiving, from an image-capture device coupled to a first vehicle, an image of a field of view of the first vehicle, wherein the image-capture device is configured to capture an image with a short exposure to emphasize objects having a brightness above a threshold;
   determining a first bounding area within the image including a depiction of a second vehicle;
   determining a second bounding area within the image including a depiction of a third vehicle, wherein at least a portion of the first bounding box overlaps the second bounding box;
   identifying a group of pixels in the image based on an intensity of the group of pixels, wherein the group of pixels is located within the overlapping portion of the bounding boxes;
   determining, based on an oscillation of the intensity of the group of pixels, a likelihood that the group of pixels is an active indicator signal;
   determining which of the second vehicle and the third vehicle the group of pixels is associated with based on the size of the group of pixels; and
   providing instructions to control, using a computing device, the first vehicle based at least on the likelihood that the determined vehicle has an active indicator signal.

9. The control system of claim 8, wherein the bounding area is determined based on a previously stored image.

10. The control system of claim 8, wherein the oscillation is between 0.75 and 2.5 Hertz.

11. The control system of claim 8, further comprising:
    determining, based on a second oscillation of a second group of pixels, a likelihood that the determined vehicle has another active indicator signal; and
    determining, based on both the likelihood that the determined vehicle has an active indicator signal and the likelihood that the second vehicle has another active indicator signal, a likelihood that the second vehicle has active emergency lights.

12. The control system of claim 8, wherein the third vehicle obscures the view of at least a portion of the second vehicle.

13. The control system of claim 8, further comprising:
    identifying a group of pixels in the image based on a second color of the group of pixels, wherein the group of pixels is located within the bounding area of the determined vehicle;

determining a correlation between an intensity of a first color of the group of pixels and an intensity of the second color of the group of pixels; and determining, based on the correlation, a likelihood that the determined vehicle has the first active turn signal.

14. A non-transitory computer readable medium having stored thereon instructions, that when executed by a computing device, cause the computing device to perform functions comprising:

receiving, from an image-capture device coupled to a first vehicle, an image of a field of view of the first vehicle, wherein the image-capture device is configured to capture an image with a short exposure to emphasize objects having a brightness above a threshold;

determining a first bounding area within the image including a depiction of a second vehicle;

determining a second bounding area within the image including a depiction of a third vehicle, wherein at least a portion of the first bounding box overlaps the second bounding box;

identifying a group of pixels in the image based on an intensity of the group of pixels, wherein the group of pixels is located within the overlapping portion of the bounding boxes;

determining, based on an oscillation of the intensity of the group of pixels, a likelihood that the group of pixels is an active indicator signal;

determining which of the second vehicle and the third vehicle the group of pixels is associated with based on the size of the group of pixels; and providing instructions to control, using a computing device, the first vehicle based at least on the likelihood that the determined vehicle has an active indicator signal.

15. The non-transitory computer readable medium of claim 14, wherein the bounding area is determined based a previously stored image.

16. The non-transitory computer readable medium of claim 14, wherein the oscillation is between 0.75 and 2.5 Hertz.

17. The non-transitory computer readable medium of claim 14, further comprising:

determining, based on a second oscillation of a second group of pixels, a likelihood that the determined vehicle has a second active turn signal; and determining, based on both the likelihood that the determined vehicle has a first active turn signal and the likelihood that the determined vehicle has a second active turn signal, a likelihood that the second vehicle has active emergency lights.

18. The non-transitory computer readable medium of claim 14, wherein the third vehicle obscures the view of at least a portion of the second vehicle.

19. The non-transitory computer readable medium of claim 14, further comprising:

identifying a group of pixels in the image based on a second color of the group of pixels, wherein the group of pixels is located within the bounding area of the determined vehicle;

determining a correlation between an intensity of a first color of the group of pixels and an intensity of the second color of the group of pixels; and determining, based on the correlation, a likelihood that the determined vehicle has the first active turn signal.

20. The non-transitory computer readable medium of claim 19, further comprising identifying a sun glare based on the correlation.

* * * * *